May 12, 1936.  H. F. BAXTER  2,040,119

DIAL CHECKED CHART

Filed Nov. 12, 1934   2 Sheets-Sheet 1

Witness: Geo. L. Chapel

Inventor
Howard F. Baxter
By Rice and Rice
Attorneys

May 12, 1936.   H. F. BAXTER   2,040,119
DIAL CHECKED CHART
Filed Nov. 12, 1934   2 Sheets-Sheet 2

Witness:
Geo L. Shape

Inventor
Howard F. Baxter

By Rice and Rice
Attorneys

Patented May 12, 1936

2,040,119

UNITED STATES PATENT OFFICE 2,040,119

DIAL CHECKED CHART

Howard F. Baxter, Grand Rapids, Mich., assignor to Baxter Laundries Corporation, Grand Rapids, Mich., a corporation of Michigan Application November 12, 1934, Serial No. 752,663

2 Claims. (Cl. 116—133)

The instant invention relates to dial checked charts and more particularly to devices for checking consecutive and/or varyingly timed operations.

The primary objects of the present invention are to provide a manually operable device of the general character above indicated enabling the checking supervisor to definitely check consecutive and/or differently timed operations; to provide such a device which is particularly suited for use in checking consecutive and/or varyingly timed washing operations in commercial laundries; to provide such a device which minimizes the possibility that one or more consecutive operations will be inadvertently omitted; and, to provide such a device which minimizes the possibility that a particular operation will be mistimed.

Figure 1:
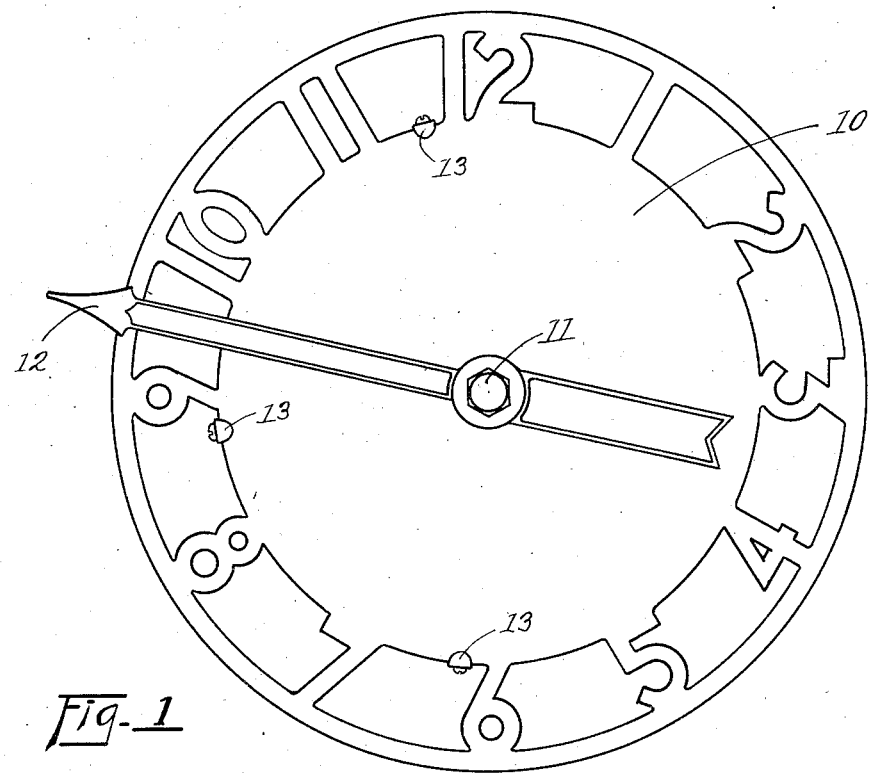
Figure 2:
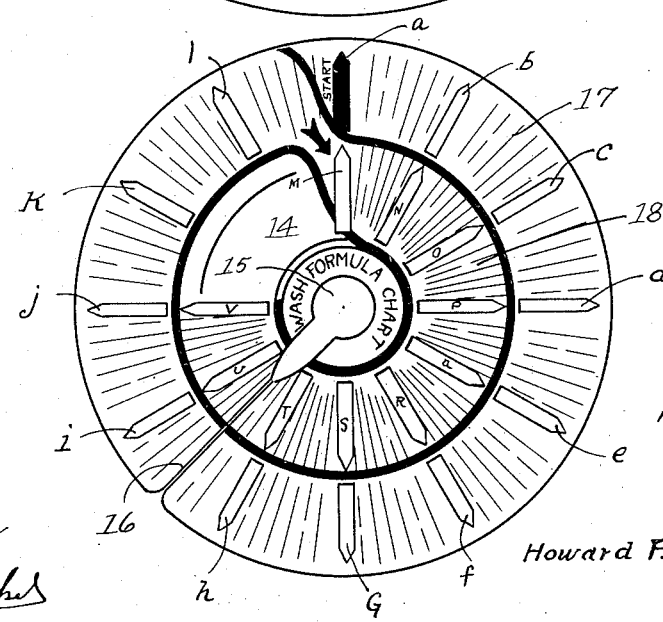
Figure 3:
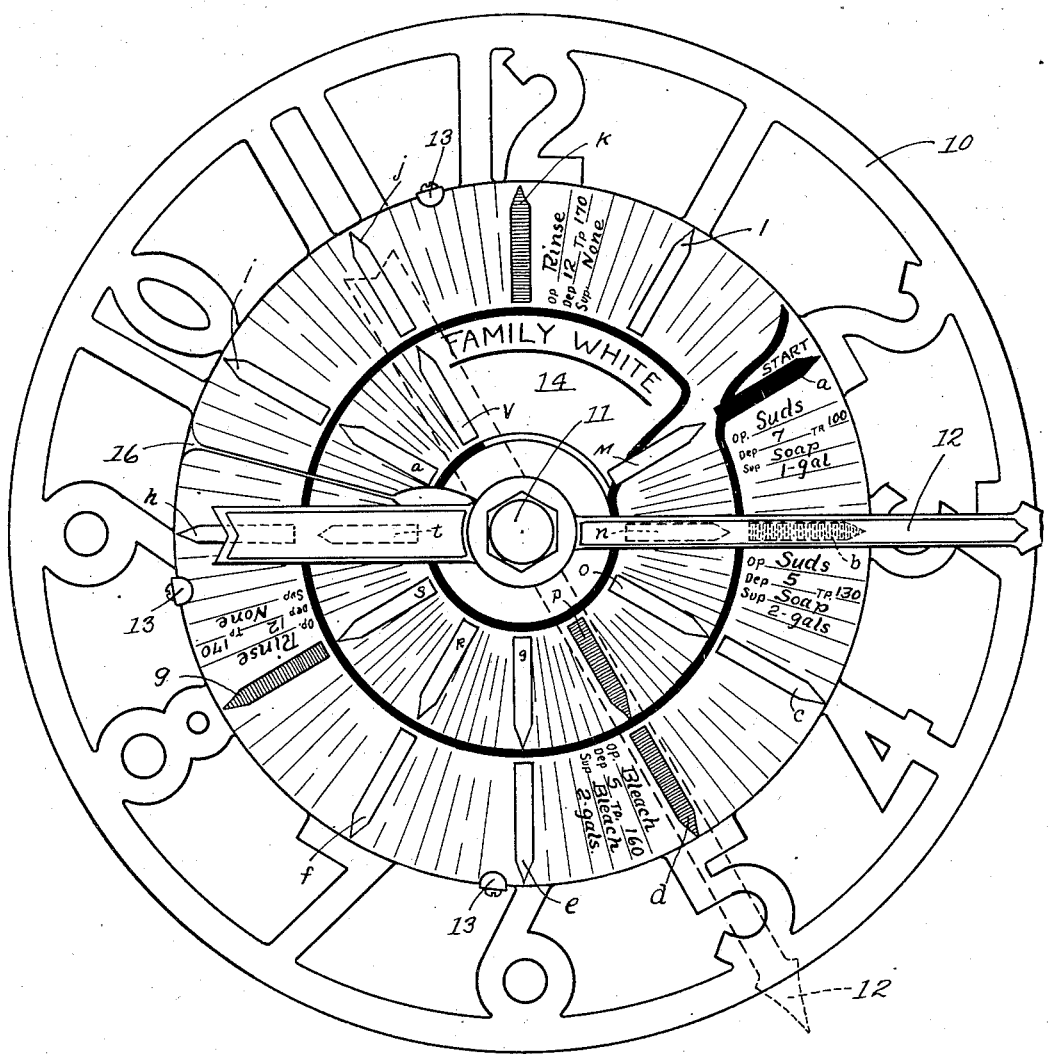

An illustrative embodiment of the invention is shown in the accompanying drawings here shown as adapted for checking and/or controlling consecutive and/or varingly timed washing operations in commercial laundries, wherein:

Figure 1 is a top plan view of the dial portion of the device and its manually rotatable pointer;

Figure 2 is a top plan view of the disc chart portion of the device bearing indicia in blank adapted to be filled in by the checking supervisor of the consecutive and/or differently timed operations; and Figure 3 is an enlarged top plan view of the device showing the disc chart portion in assembled relation with its dial portion, its blank indicia having been filled in by the supervisor who is to check and/or control a given series of washing operations of varyingly timed periods.

Referring to the drawings in which like parts of the device shown are designated by the same numerals in the several views, a dial 10 bearing clock indicia is provided with a centrally disposed hub 11 upon which is mounted a manually rotatable pointer 12. The dial has a series of upstanding inwardly extending clips 13 all at the same side of a diameter of the dial, which clips overhang and frictionally engage the disc chart 14 adjacent its circumferential edge when the chart is in assembled relation with the dial as shown in Figure 3.

As shown in Figures 1 and 3, these clips 13 are all at the left hand side of the diameter which extends through the dial's hour figures 12 and 6.

This chart is of smaller diameter than the dial and is provided with a central aperture 15 from which a radial slit 16 extends to the circumferential or marginal edge of the chart adapting it to be slid onto the face of the dial and thereafter for manual rotatable adjustment thereon below the pointer 12 of the dial 10.

The chart is divided into a marginal circular band 17 and an inner circular band 18 (Fig. 2) and each band is divided into a plurality of equally spaced time-indicating segments as by the arrows $a$ to $v$ inclusive.

Each segment of the inner and outer bands bears indicia in blank as indicated in Figure 2 adapted to be filled in by the supervisor before the chart is assembled with its dial as shown in Figure 3.

The dial portion of the device may be mounted on or adjacent the machine whose timed and consecutive operations are to be checked, in any suitable manner.

In instances wherein the device is intended for use in checking consecutive and/or differently timed washing operations in a commercial laundry, it will be understood that different washing formulae are required for different types of laundry work. In other words, a different washing formula is required for "family white" work than is required for "commercial flat" work or that required for "shirts and collars." Thus for example, in a "family white" washing operation the supervisor may fill in the blank chart shown in Figure 2 in the manner as shown in Figure 3 before it is assembled with its dial. It will be understood however, that pre-printed charts for a given type or work may be used if desired.

"Family white" work, it will be assumed, requires five different consecutive operations, (1) a five minute "suds" operation indicated by the segment (in the outer marginal band 17) between the arrows $a$ and $b$, (2) a ten minute "suds" operation indicated by the pair of segments between the arrows $b$ and $d$, (3) a fifteen minute "bleach" operation indicated by the three segments between the arrows $d$ and $g$, (4) a twenty minute "rinse" operation indicated by the four segments between the arrows $g$ and $k$, and (5) a twenty-five minute "rinse" operation indicated by the five segments between the arrows $k$ and $p$. Since each segment here represents a five minute period, the arrows designating the beginning and the end of an operation requiring a given length of time, are preferably colored. Thus, since the first operation requires five minutes, the arrows $a$ and $b$ are colored as indicated, as are the arrows $b$ and $d$ since the second operation requires ten minutes. The arrows $g$, $k$ and $p$ are likewise preferably colored to indicate the several time periods therebteween.

The chart having been filled in by the supervisor for "family white" work is next slid onto the face of the dial below the pointer. Assuming that it is ten minutes after the hour when the first operation indicated by the chart is to start, the chart which has been slid onto the dial below the pointer is rotated until the arrow *a* marked "Start" is pointing to the numeral 2 on the dial and the pointer 12 is then manually rotated to point to the numeral 3 on the dial, all as shown in Figure 3.

The checking supervisor at fifteen minutes after the hour knows that the first operation, indicated by the segment between the arrows *a* and *b*, has been completed. Since the next operation requires ten minutes, the checking supervisor manually rotates the pointer to the numeral 5 on the dial as the pointer is indicated in dotted lines in Figure 3. At twenty-five minutes after the hour, the checking supervisor knows that the second operation has been completed.

Each operation thus required for the "family white" work is checked and controlled by the pointer in the manner previously indicated and the possibility that one or more consecutive operations may be inadvertently omitted and/or that the several operations may be mis-timed is minimized. Thus, when each operation is completed, the operator will make such changes as are required before the next operation is commenced.

While but one specific embodiment of this invention has been herein shown and described, it will be understood that numerous details of the construction shown may be altered or omitted without departing from the spirit of this invention as defined by the following claims.

I claim:

1. In a device of the class described: a dial bearing circularly arranged clock indicia and having a central spindle; a pointer manually rotatable on the spindle; a flexible disc chart having a central aperture and a slit of less width than the diameter of the spindle extending from the disc's circumferential edge to its said aperture adapting the chart to be slid onto the face of the dial under the pointer to a position wherein said aperture receives the spindle, the chart having angularly spaced peripheral portions for indicating thereon operations to be performed in timed sequence and movable into registration with said indicia by rotating the chart, the dial having clips located at the same side of a diameter of the dial and extending over the chart's circumferential edge for holding the same against accidental rotation.

2. In a device of the class described: a dial bearing circularly arranged indicia and having a central spindle; a pointer manually rotatable on the spindle; a flexible disc chart having a central aperture and a slit of less width than the diameter of the spindle extending from the disc's circumferential edge to its said aperture adapting the chart to be slid onto the face of the dial under the pointer to a position wherein said aperture receives the spindle, the chart having angularly spaced peripheral portions for indicia movable into registration with the dial's indicia by rotating the chart, the dial having clips located at the same side of a diameter of the dial and extending over the chart's circumferential edge for holding the same against accidental rotation.

HOWARD F. BAXTER.